United States Patent [19]
Jabbi et al.

[11] Patent Number: 5,801,719
[45] Date of Patent: Sep. 1, 1998

[54] MICROPROCESSOR WITH GRAPHICS CAPABILITY FOR MASKING, ALIGNING AND EXPANDING PIXEL BANDS

[75] Inventors: Amandeep Jabbi, Mountain View; Stephen K. Howell, Santa Clara, both of Calif.

[73] Assignee: Sun Microsystems, Inc., Palo Alto, Calif.

[21] Appl. No.: 563,089

[22] Filed: Nov. 27, 1995

[51] Int. Cl.$^6$ ............................................. G06F 13/00
[52] U.S. Cl. .................... 345/524; 345/523; 345/505; 395/800; 395/391
[58] Field of Search .................. 395/501–506, 395/509, 522, 523, 524, 800, 391; 345/186–188, 501–506, 509, 510, 522–524

[56] References Cited

U.S. PATENT DOCUMENTS

| | | | |
|---|---|---|---|
| 4,985,848 | 1/1991 | Pfeiffer et al. | 395/505 |
| 5,268,995 | 12/1993 | Diefendorff et al. | 395/501 |
| 5,557,759 | 9/1996 | Crump et al. | 395/309 |
| 5,606,677 | 2/1997 | Balmer et al. | 395/384 |

OTHER PUBLICATIONS

MC88110 Second Generation RISC Microprocessor User's Manual, Motorola Inc. 1991, pp. 1–5 to 5–25.
Diefendorff, K. et al., Organization of the Motorola 88110 Superscalar RISC Microporcessor, IEEE Micro, Apr. 1992, vol. 12, No. 2, pp. 40–63.
Knebel, P. et al., HP's PA7100LC: A Low–Cost Superscalar PA–RISC Processor, COMPCON Spring '93 IEEE Computer Society Int'l. Conference, 1993, pp. 441–447.
MC88110 Second Generation RISC Microporcessor User's Manual, Motorola Inc. 1991, pp. 3–26, 10–55.
Hung et al., "Statistical Inverse Discrete Cosine Transforms for Image Compression," *SPIE* 2187:196–205 (Apr., 1994).
Gwennap, Ultrasparc Adds Multimedia Instructions, *Microprocessor Report*, pp. 16–18 (Dec., 1994).
"i860™ Microprocessor Family," *Intel Microprocessors*, vol. II, 1991.
Bass et al., "The PA 7100LC Microprocessor: A Case Study of IC Design Decisions in a Competitive Environment," *Hewlett–Packard Journal*, 46(2) : 12–22 (Apr., 1995).
Bass et al., "Design Methodologies for the PA 7100LC Microprocessor," *Hewlett–Packard Journal*, 46(2) : 23–35 (Apr., 1995).
Lee et al., Real–Time Software MPEG Video Decoder on Multimedia –Enhanced PA 7100LC Processors, *Hewlett–Packard Journal*, 46 (2) :60–68 (Apr., 1995).
Martin, "An Integrated Graphics Accelerated for a Low–Cost Multimedia Workstation," *Hewlett–Packard Journal*, 46 (2) :43–50 (Apr., 1995).
Pearson, "A Low–Cost, High Performance PA RISC Workstation with Built–In Graphics," *Hewlett–Packard Journal*, 46 (2) :6–11 (Apr., 1995).

*Primary Examiner*—Matthew M. Kim
*Assistant Examiner*—U. Chauhan
*Attorney, Agent, or Firm*—Townsend and Townsend and Crew LLP

[57] ABSTRACT

Image operations are implemented using a specially developed instruction set in a parallel processing environment that maximizes parallelization of operations. Graphics data partitioned addition and multiplication instructions allow for simultaneous addition or multiplication of multiple words of graphics data in parallel using a number of processing sub-units of a graphics execution unit.

4 Claims, 5 Drawing Sheets

MICROPROCESSOR WITH GRAPHICS CAPABILITY FOR MASKING, ALIGNING AND EXPANDING PIXEL BANDS

A portion of the disclosure of this patent document contains material which is subject to copyright protection. The copyright owner has no objection to the xerographic reproduction by anyone of the patent document or the patent disclosure in exactly the form it appears in the Patent and Trademark Office patent file or records, but otherwise reserves all copyright rights whatsoever.

RELATED APPLICATIONS

The present invention is related to U.S. patent application Ser. No. 08/236,572 by Van Hook et al., filed Apr. 29, 1994, entitled "A Central Processing Unit with Integrated Graphics Functions," as well as U.S. Pat. application Ser. No. 08/398, 111 (Attorney Docket No. P-1867) by Chang-Guo Zhou et al., filed Mar. 3, 1995, entitled "Color Format Conversion in a Parallel Processor," both of which are incorporated in their entirety herein by reference for all purposes.

BACKGROUND OF THE INVENTION

The present invention relates to the manipulation of digital images. In particular, the invention relates to operations which may be performed on digital images having color or monochrome components.

Computer systems are being used with increasing frequency to manipulate, store, and display video images, e.g., on computer display screens and televisions. These images are formed from a number of individual pixel elements which, frequently, have color components associated with each element. The color components, otherwise known as "bands", generally represent gradients of red, green and blue. A fourth, or alpha, band may also be associated with each pixel. Each color band may have a number of gradations, thereby allowing the display and manipulation of highly defined images. Other applications may require more or less than four bands, or may require bands having different components to support greater resolution requirements.

A number of applications require the manipulation of these images. Many intermediate operations used in image processing require the generation of an output image based upon multiple source images. One example of an operation which requires such an intermediate step is x-ray imaging. Certain x-ray imaging applications require that a grid image be combined with an x-ray image to generate an overlaid grid on the image. Another common application involves replacing every black pixel in an area with white pixels to enhance, e.g., bone structure in an image area. Other applications may require that a source image be enhanced using a second image having known color components. Numerous other applications require similar manipulations of input images to produce a new image.

Each of these operations, unfortunately, requires a large number of computer instruction cycles due to the large amount of data involved. As a result, existing approaches to such image manipulation employ special graphics hardware, thereby adding cost and complexity to existing computer systems. Complex image manipulations cannot be efficiently performed using only conventional, general-purpose microprocessors.

The problem is complicated by the need to retain a high degree of image resolution and precision. The performance of existing systems is impacted by the need to perform pixel scaling operations to compensate when a pixel value would otherwise be out of range. For an eight bit pixel band, for example, the band information may have any value from 0 to 255. Some pixel operations, e.g. an addition or multiplication, may result in a band value greater than 255 or less than 0. This requires the scaling of the band value. Present systems perform this function in software, resulting in degraded processing speed.

Accordingly, it is desireable to provide a system which permits the performance of image manipulations using a central processing unit and appropriately configured software. No additional special-purpose hardware components need be used.

SUMMARY OF THE INVENTION

The present invention provides a fast, and highly cost-effective approach to performing operations on graphics image data. Image operations are implemented using a specially developed instruction set in a parallel processing environment that maximizes parallelization of operations. Graphics data partitioned addition and multiplication instructions allow for simultaneous addition or multiplication of multiple words of graphics data in parallel using a number of processing sub-units of a graphics execution unit.

Source images may be manipulated to produce a destination image by first aligning the pixel data within the images. Individual source pixels may then be operated on to produce individual destination pixels. Operations which may be performed include arithmetic and logical operations. When arithmetic operations, such as addition, subtraction, or multiplication are performed, the source pixel data is first expanded from, e.g., 8 bits per band to 16 bits per band. The arithmetic operation is then performed on the expanded pixel data to produce an expanded result. This expanded result is clipped and scaled down to the original length (e.g., 8 bits per band). In one specific embodiment of the present invention, the expansion, arithmetic operation, and the clipping and scaling are done in a graphics execution unit of a pipelined processor. The graphics execution unit may have two parallel partitioned execution paths. The result is an ability to perform image processing much more quickly than in previous systems.

For a fuller understanding of the nature and advantages of the invention, reference should be made to the ensuing description taken in conjunction with the accompanying drawings.

DESCRIPTION OF SPECIFIC EMBODIMENTS

Figure 1:
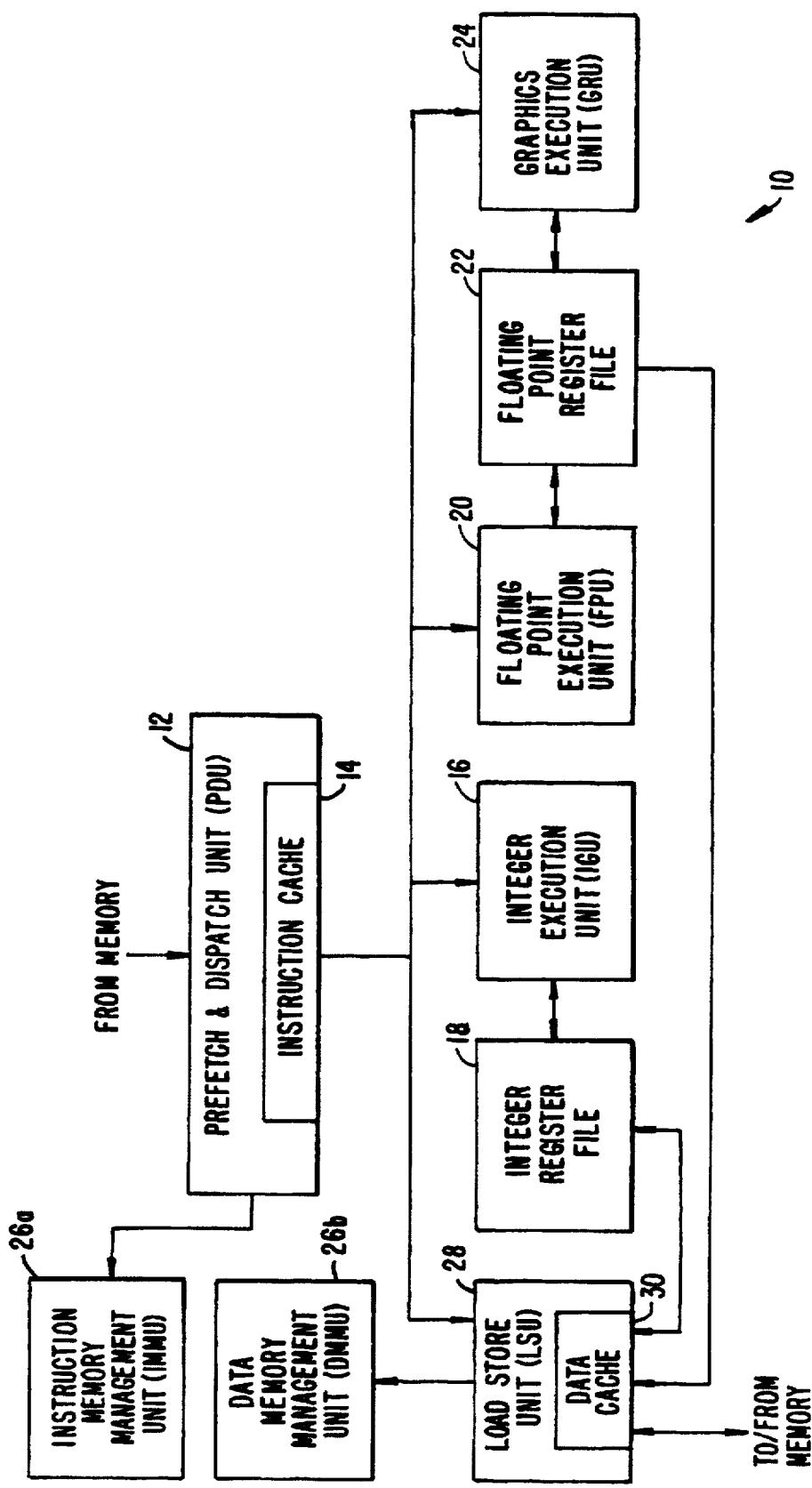
FIG. 1 is a block diagram of a CPU of an exemplary graphics computer system capable of supporting various embodiments of the present invention.

Referring now to FIG. 1, a block diagram is shown which depicts one particular embodiment of a central processing section 10 for use in a graphics computer system which may be used to perform the image operations of the present invention. Central processing section (or CPU) 10 may include a prefetch and dispatch unit (PDU) 12, an instruction cache 14, an integer execution unit (IEU) 16, an integer register file 18, a floating point unit (FPU) 20, a floating point register file 22, and a graphics execution unit (GRU) 24, coupled to each other as shown. Additionally, CPU 10 includes two memory management units (IMMU & DMMU) 26a–26b, and a load and store unit (LSU) 28, which in turn includes a data cache 20, coupled to each other and the previously described elements as shown. Together the components of CPU 10 fetch, dispatch, execute, and save execution results of instructions, including graphics instructions, in a pipelined manner.

PDU 12 fetches instructions from memory and dispatches the instructions to IEU 16, FPU 20, GRU 24, and LSU 28 accordingly. Prefetched instructions are stored in instruction cache 14. IEU 16, FPU 20, and GRU 24 perform integer, floating point, and graphics operations, respectively. In general, the integer operands/results are stored in integer register file 18, whereas the floating point and graphics operands/results are stored in floating point register file 22. Additionally, IEU 16 also performs a number of graphics operations, and appends address space identifiers (ASI) to addresses of load/store instructions for LSU 28, identifying the address spaces being accessed. LSU 28 generates addresses for all load and store operations. The LSU 28 also supports a number of load and store operations, specifically designed for graphics data. Memory references are made in virtual addresses. MMUs 26a–26b map virtual addresses to physical addresses.

PDU 12, IEU 16, FPU 20, integer and floating point register files 18 and 20, MMUs 26a–26b, and LSU 28 can be coupled to one another in any of a number of configurations as described more completely in U.S. patent application Ser. No. 08/236,572 (the '572 application). As further described in the '572 application, the graphics execution unit 24 is partitioned into two separate, parallel execution paths which permit parallel performance of addition/subtraction and multiplication or packing operations.

Figure 2:
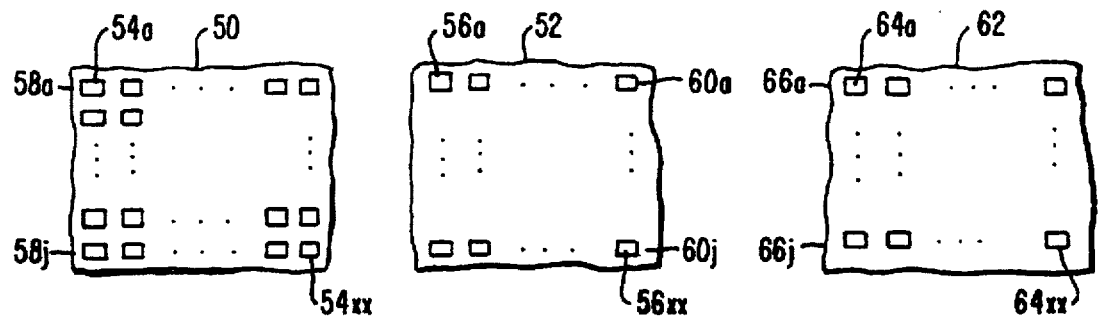
FIG. 2 is a representation of pixel-based images for manipulation using features of the present invention.

Image processing applications frequently manipulate one or more source images to produce a destination image. In some instances, a single input source image may be combined with a user-defined array to produce a destination image. A system according to the present invention permits manipulation of both source images and user-defined arrays. FIG. 2 depicts a pair of source images 50, 52 which may be manipulated using concepts of the present invention. Each image includes a number of pixels 54a–xx, 56a–xx aligned in a number of rows 58a–j, 60a–j. Each pixel 54, 56 is defined to have one or more bands, each band representing a color component, e.g., alpha (A), green (G), blue (B), or red (R). Those skilled in the art will recognize that other colors may be represented and that other numbers of bands may be employed. These bands may be represented by, e.g., one, eight or 16 bits of data. Thus, for example, the color of a single pixel 54 may be defined by up to four or eight bytes of data. Applications frequently require that two source images 50, 52 be combined in some manner to form a destination image 62. For example, each pixel and color component of image 50 may be added to, multiplied by, or subtracted from corresponding pixel and color components of image 52. Other operations may also be performed to produce a destination image 62 having a number of pixels 64a–xx arranged in a number of rows 66a–j. Embodiments of the present invention permit the performance of such operations by using the CPU 10 described above and appropriately configured computer software. No additional, or special purpose hardware components are needed.

Figure 3:
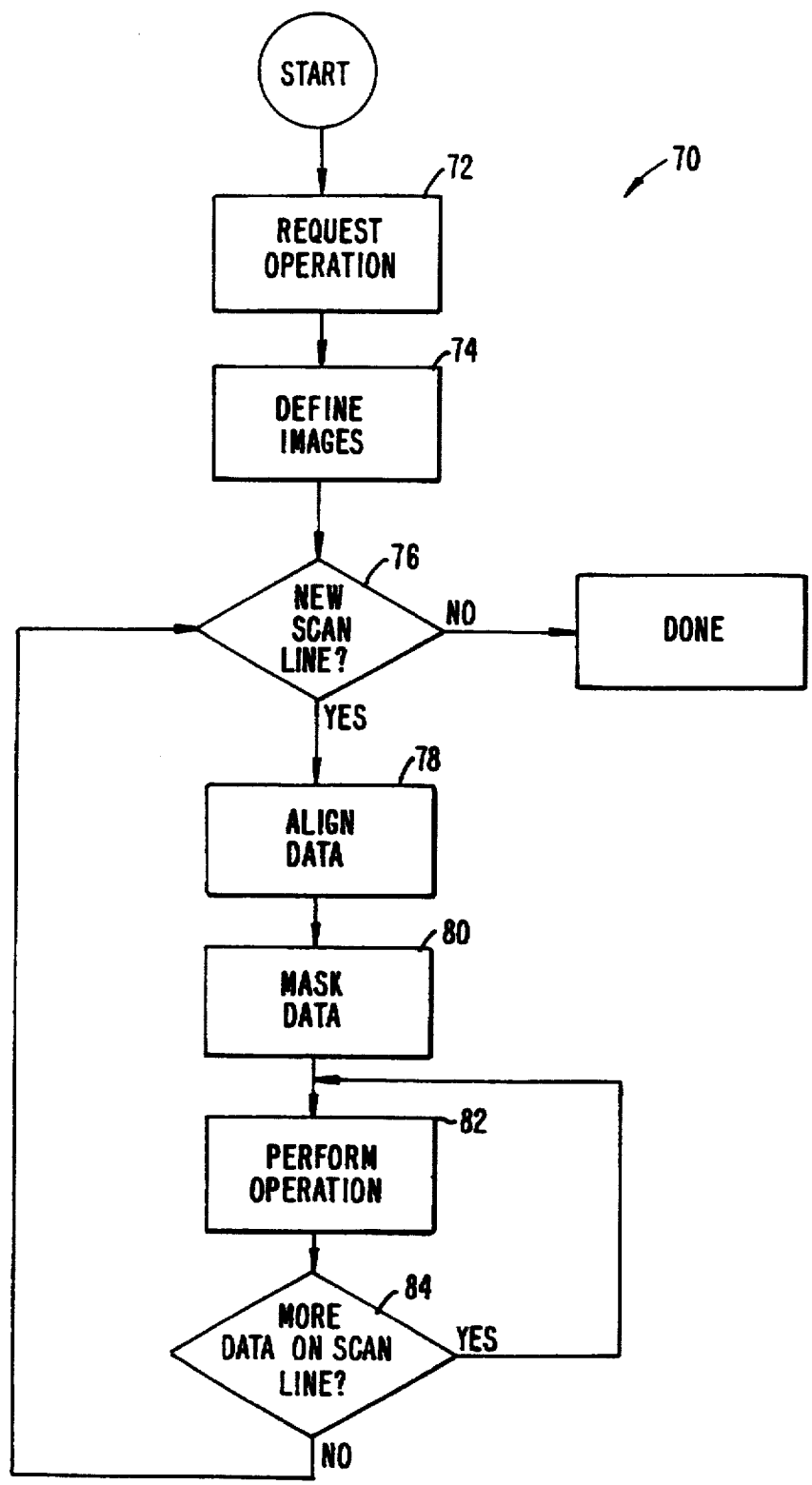
FIG. 3 is a flow diagram depicting a procedure according to the present invention for manipulating images in a graphics system such as the system of FIG. 1.

Referring now to FIG. 3, a flow diagram 70 is depicted which illustrates a basic procedure by which input images 50, 52 may be manipulated according to techniques of the present invention to produce a destination image 62. Features of the present invention permit such manipulation in a pipelined manner. In general, the present invention performs such manipulations once an operation is requested in step 72. The requested operation may include an arithmetic operation (e.g., add, subtract, multiply, divide) or a logic operation (e.g., XOR, AND, MAX, MIN) on one or more source images. Once an operation has been requested, the source and destination images are defined in step 74. This may include, e.g., defining the location and size of the images, the number of pixels in the images, the number of bands in each pixel, etc. Once the size of the image has been determined, processing of scanline data may be repeated until all scan lines have been processed (step 76). If more scanlines exist in the image set to be manipulated, operation continues by aligning data to be manipulated in step 78. The alignment, in general, ensures that data from the source images 50, 52 and the destination image 62 are aligned. In one specific embodiment, data is aligned along 8 byte boundaries.

Once properly aligned, the source data is masked in step 80 to accommodate the desired number of bands or to select among the possible bands. This masking may employ, e.g., predefined mask tables. Example mask data are shown in TABLE I, which depicts mask tables for processing 1–4 bands of 1–4 banded 8-bit images (numbers depicted in the tables are in hexadecimal format as indicated by the prefix "0x"). These tables help ensure proper alignment where, e.g., only several selected bands are needed for the destination image. Different masks may be selected to accommodate different destination pixel band numbers. Other mask tables may be used for processing 1–4 bands of 1–4 banded 16-bit images, or other pixel formats.

TABLE I

| BAND 1 | BAND 2 | BAND 3 | BAND 4 |
| --- | --- | --- | --- |
| 0x00000000 | 0x00000000 | 0x00000000 | 0x00000000 |
| 0x00ffffff | 0x00555555 | 0x00924924 | 0x00111111 |
| 0x00000000 | 0x00aaaaaa | 0x00249249 | 0x00222222 |
| 0x00ffffff | 0x00ffffff | 0x00b6db6d | 0x00333333 |
| 0x00000000 | 0x00000000 | 0x00492492 | 0x00444444 |
| 0x00ffffff | 0x00555555 | 0x00db6db6 | 0x00555555 |
| 0x00000000 | 0x00aaaaaa | 0x006db6db | 0x00666666 |
| 0x00ffffff | 0x00ffffff | 0x00ffffff | 0x00777777 |
| 0x00000000 | 0x00000000 | 0x00000000 | 0x00888888 |
| 0x00ffffff | 0x00555555 | 0x00924924 | 0x00999999 |
| 0x00000000 | 0x00aaaaaa | 0x00249249 | 0x00aaaaaa |
| 0x00ffffff | 0x00ffffff | 0x00b6db6d | 0x00bbbbbb |
| 0x00000000 | 0x00000000 | 0x00492492 | 0x00cccccc |
| 0x0bffff | 0x00555555 | 0x00db6db6 | 0x00dddddd |
| 0x00000000 | 0x00aaaaaa | 0x006db6db | 0x00eeeeee |
| 0x00ffffff | 0x00ffffff | 0x00ffffff | 0x00ffffff |

Once mask data has been selected and the data in each of the sources and destination have been aligned, the image data is in a form to be manipulated. The requested operation is performed in step 82. Details of different example operations will be discussed further below. The requested operation is repeated until all of the pixel data on the current scanline has been processed (step 84). This procedure may be repeated until each scanline of the images have been processed (step 76). The final product is a destination image which is a function of one or more source images. The destination image may be, e.g., stored in memory for further manipulation.

One implementation of steps 72–84 will now be discussed in further detail. An arithmetic or logical operation may be requested in step 72 by, e.g., specifying the use of a graphics arithmetic or logical operator. In one specific embodiment, graphics operators may be specified in either eight or 16 bit formats. The eight bit formats may be used to process pixel data having bands formed from eight bits of data. Similarly, the 16 bit formats may be used to process pixel data having bands formed from 16 bits of data. After it has been determined, in step 72, that a graphics image operation has been requested, the images to be manipulated are defined in step 74.

In one specific embodiment of the present invention, the primary image to be defined is the destination image 62. Specifically, the destination image 62 may be defined by determining the upper left pixel location of the image, the number of bands in the image, the width of the image, and the number of rows in the image 62. The upper left pixel locations of the source images 50, 52 may also be defined in step 74. Determining the upper left pixel locations of the source 50, 52 and destination 62 images provides a starting point for the manipulation of the images. Those skilled in the art will recognize that other approaches may be taken to define the images.

Operations on individual pixels in the source images 50, 52 may be conducted sequentially along each scanline of the destination image 62. Thus operations are repeated until every scanline of the destination image 62 has been manipulated. Several operations are conducted for each scanline. In the case where a new scanline is to be processed, data is aligned in step 78. In one specific embodiment of the present invention, all data is eight byte aligned. This ensures that all image data is aligned, including source 50, 52 and destination 62 image data. Masks may be used, for example, where only one particular band is to be processed or where the destination image 62 is to be formed from, e.g., only Red and Green bands. These band selections and operations may be performed, in one embodiment, using predefined mask tables as described above.

Figure 4:
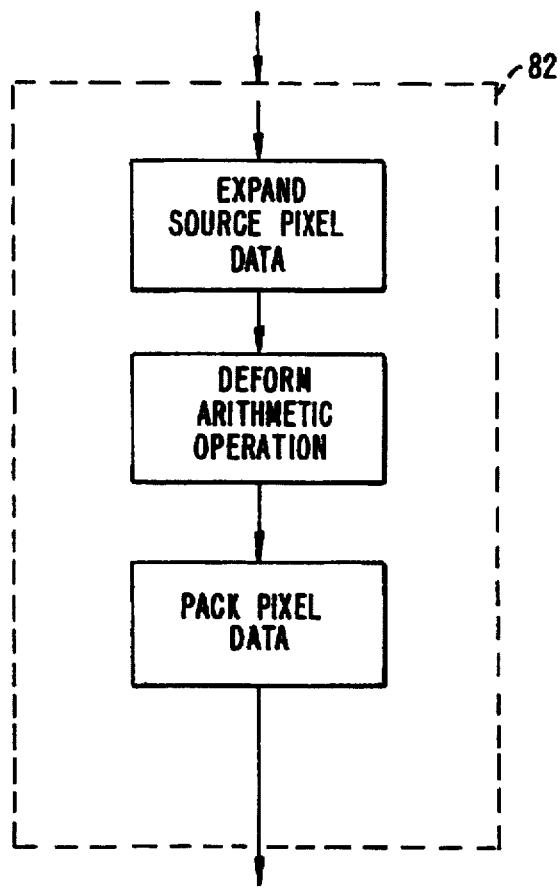
FIG. 4 is a flow diagram depicting arithmetic operations performed in conjunction with the procedure of FIG. 3.

A selected operation 82 may now be performed. In one specific embodiment of the present invention, arithmetic operations, such as addition, subtraction, or multiplication may be performed as the selected operation (step 82). Steps included in such arithmetic operations are depicted in the flow diagram of FIG. 4. Before performing the arithmetic operation, the source image 50, 52 pixel data is expanded (step 90). If pixel information in a particular application is stored in eight bit unsigned format (i.e., each band of a pixel is defined by eight bits), each band is expanded to a 16 bit signed format. In this case, expanded band information for a four-banded pixel may be represented in a single 64 bit wide register. Where pixel information is stored in 16 bit signed format, each band may be expanded to a 32 bit result. That is, expanded band information for a four-banded pixel may be stored in two 64 bit wide registers. The expanded band data may then be added, subtracted, or multiplied (step 92) using a partitioned add, subtract, or multiply.

Figure 5A:
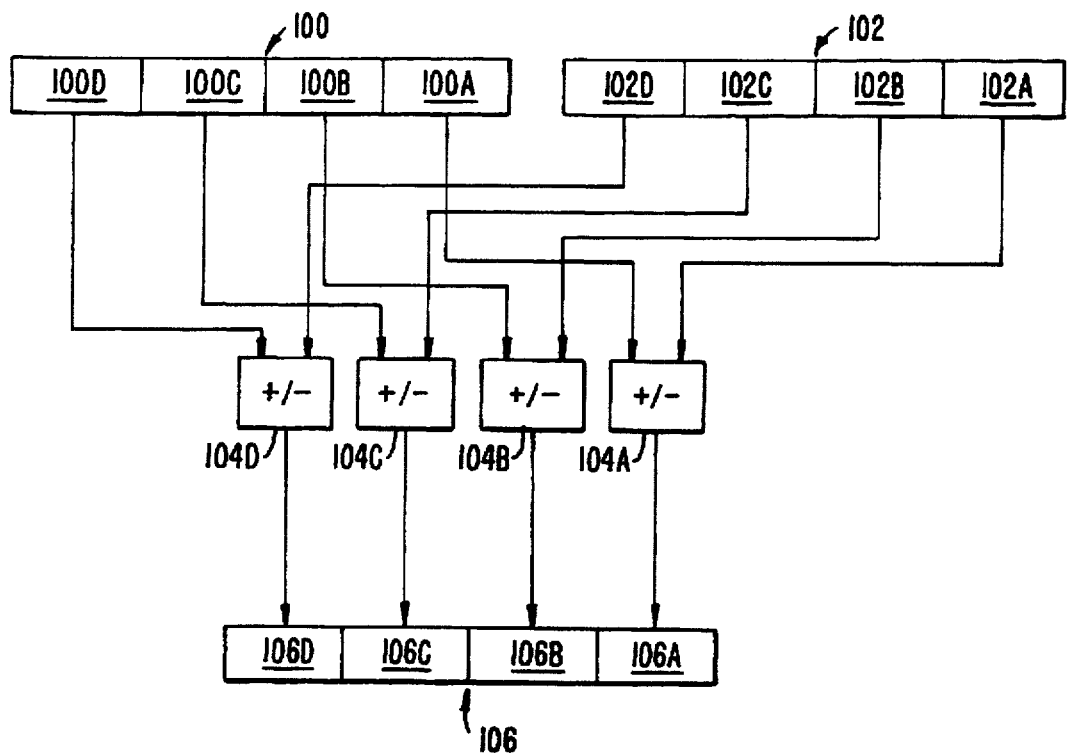
FIG. 5A–C are block diagrams depicting arithmetic image operation procedures using a graphics system such as the system of FIG. 1.
Figure 5C:
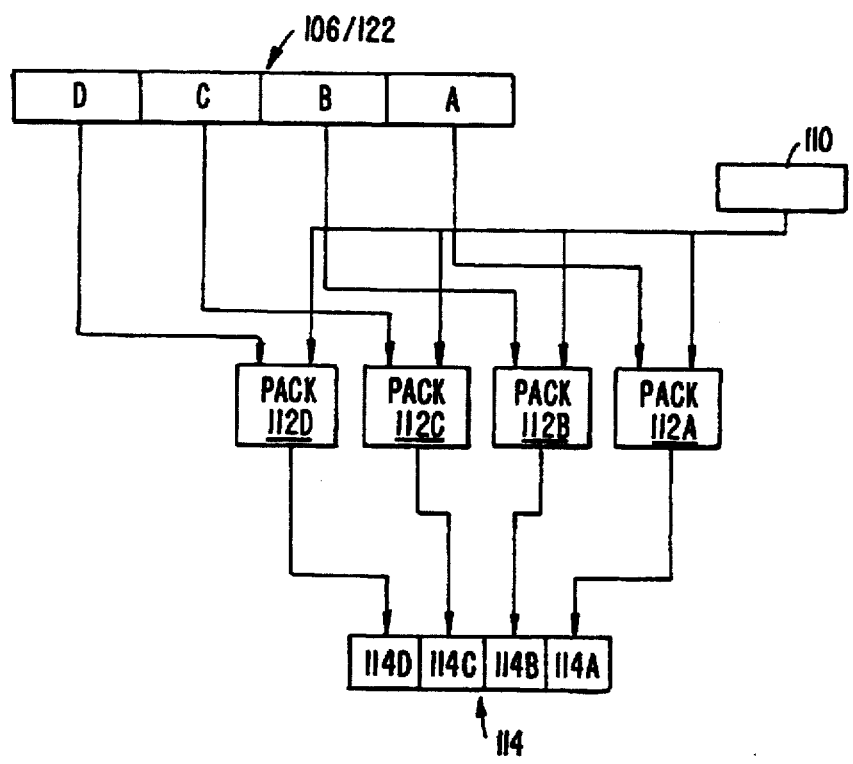
Figure 5B:
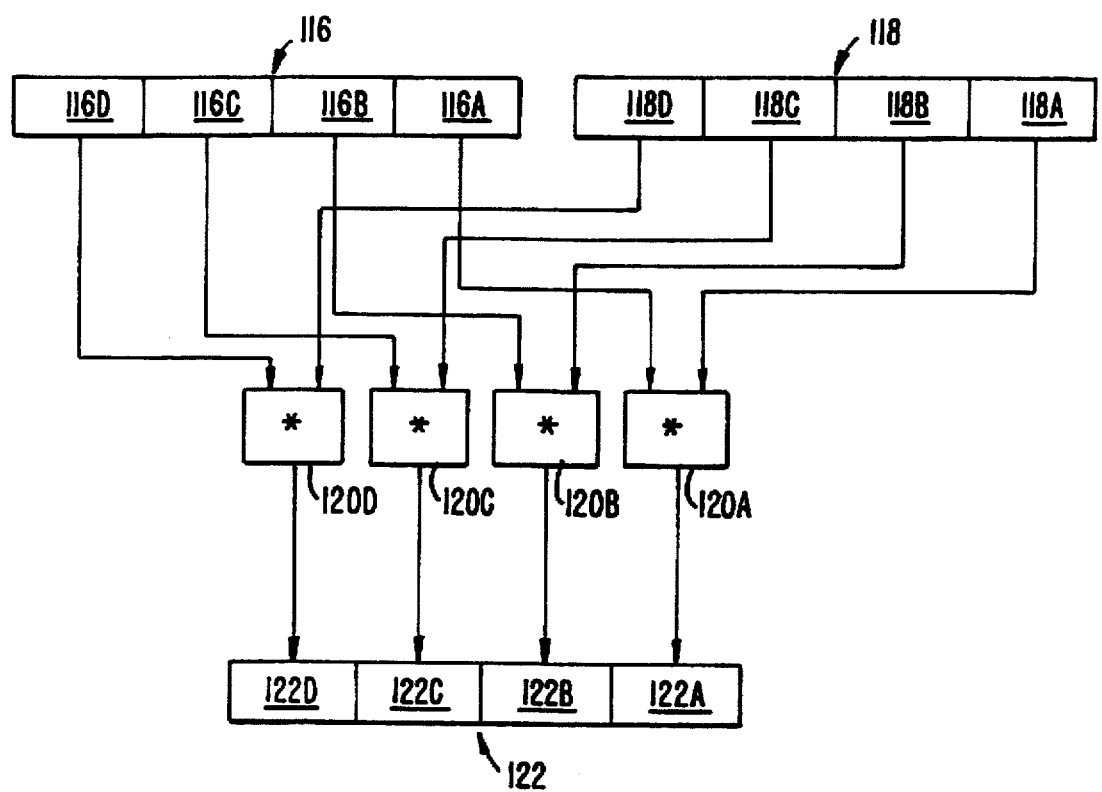

Implementation details for steps 92 and 94 are shown in FIGS. 5A–5C. FIG. 5A depicts registers 100, 102 coupled to processing sub-units 104. Processing sub-units 104 may be included, e.g., in the graphics execution unit 24 described above in conjunction with the particular CPU shown in FIG. 1. The outputs of processing sub-units 104 are coupled to a register 106. In one embodiment, registers 100, 102 are each 64 bits in length and are each partitioned into four 16-bit fixed point segments 100A–D, 102A–D. Each of these segments may be used to store expanded data representing a band of a pixel. For example, segments 100A–D may store expanded data representing the A, G, B, and R bands of a pixel from source image 50, while segments 102A–D store expanded data representing the A, G, B and R bands of a pixel from source image 52. Processing sub-units 104A–D operate in addition or subtraction modes (depending upon the selected operation), simultaneously and in parallel to add or subtract data from registers 100 and 102. The results of the selected operation are stored in respective partitioned segments 106A–106D of a register 106, which are coupled to outputs of processing sub-units 206A–D respectively. Register 106 is partitioned as described above with respect to registers 100, 102.

Similarly, as shown in FIG. 5B, pixel data may be multiplied by storing expanded pixel information in registers 116A–D and 118A–D coupled to processing sub-units 120A–D. The result is stored in partitioned register 122. As noted above and in the '572 application, multiplication and addition operations may be performed in parallel in parallel execution paths of the graphics execution unit 24.

By storing pixel band information from a first source image 50 in register 100 and information from a second source image 52 in register 102 and operating processing sub-units 104A–D for one instruction cycle in either the add or subtract modes, an entire pixel operation may be accomplished in a single instruction cycle. Further, a parallel multiplication operation may also be accomplished in processing sub-units 120A–D. In another embodiment, for use where 16 bit data is used to represent pixel band information, registers 100, 102, 106, 116 and 118 may each be used to store expanded 32 bit data strings representing each band of a pixel. In this embodiment, two instruction cycles would be needed for a pixel operation where four bands of pixel information are processed.

To complete the addition, subtraction, or multiplication operation, the new value for each band (stored in registers 106 or 122) must be packed down to the original format (e.g., eight or 16 bits per band). In one particular embodiment of the present invention, this is performed using processing sub-units 112A–D shown in FIG. 5C. These processing sub-units 112A–D are also included in graphics execution unit 24 of FIG. 1. This packing operation, generally, takes the expanded data format from registers 106 or 112 and scales and clips the data to the original band format. In the situation where the original format is formed of eight bit bands, and where register partitions 106A–D or 112A–D each contain 16 bit fixed data, the band information must be scaled and clipped so that a number between 0 and 255 is produced. The graphics execution unit 24 described above can scale and clip four 16 bit fixed point numbers into four eight bit unsigned integers in a single instruction cycle using a partitioned packing operation.

In the partitioned packing operation, processing sub-units 112A–112D scale 16 bit fixed point data according to a scale factor stored in scale factor register 110, which is described more completely in the '572 application, and which is coupled to respective inputs of processing sub-units 106A–D. Also in the packing mode, processing sub-units 106A–D clip the scaled data to the range of values 0–255 (for eight bit band formats). The results of the scaling and clipping of processing sub-units 112A–D are stored in eight bit segments 114A–114D, respectively, of register 114. Thus, eight bit unsigned integers representing the Alpha, Green, Blue, and Red bands of a pixel are produced. This pixel is a portion of destination image 62 and was formed from pixels of source images 50 and 52. Similar packing operations may be performed where band information is to be represented in 16 bit formats.

Other partitioned operations performed by the graphics execution unit include partitioned add and subtract, data alignment, merge, expand and logical operations that are performed in one cycle, and partitioned multiplication, compare, pack and pixel distance operations that are performed in three cycles. These partitioned operations are described in detail in "Visual Instruction Set User's Guide," a preliminary publication by Sun Microsystems, Inc., attached herein as Appendix A. The logical instructions (e.g., MIN, MAX, AND, XOR, etc.) may be performed on source image data in step 82 of FIG. 3 in a single instruction cycle.

Experimentation has shown that, in general, graphics image manipulation may be accomplished up to three times more quickly than in previous systems. In one embodiment, image operations (including arithmetic and logical) may be performed at a rate of 55 Million pixel operations per second. This may be achieved through use of the parallel processing units described above in conjunction with FIG. 1. As described above, CPU 10 includes four separate processing units, i.e., LSU 28, IEU 16, FPU 20, and GRU 24. Each of these processing units operate in parallel and can each execute a respective instruction simultaneously. GRU 24 executes the partitioned multiplication, the partitioned addition, and the partitioned packing operations described above. GRU 24 has two separate execution paths and can execute two instructions simultaneously. GRU 24 can execute a partitioned addition operation while simultaneously executing either a partitioned multiplication or a partitioned packing operation. By pipelining the various image operations described above, performance in manipulating and performing operations on images is greatly enhanced.

As will be appreciated by those familiar with the art, the present invention may be embodied in other specific forms without departing from the spirit or essential characteristics thereof. For example, while a particular computer architecture has been described, the present invention may be implemented using other architectures supporting parallel instruction execution. Further, different pixel formats and lengths may be manipulated using techniques of the present invention.

Accordingly, the disclosure of the invention is intended to be illustrative, but not limiting, of the scope of the invention which is set forth in the following claims.

What is claimed is:

1. A method for performing a selected operation on a first source image formed from a first plurality of pixel data and a second source image formed from a second plurality of pixel data to produce a destination image formed of a plurality of destination pixel data, said first plurality of pixel data having a plurality of bands, the method comprising the steps of:

determining a size of said destination image, including a height and a width in destination pixels, each of said plurality of destination pixels having at least a first set of band data;

aligning said first and second pluralities of pixel data with said destination pixel data;

masking said first plurality of pixel data to select only certain bands to form a first masked plurality of pixel data;

expanding each of said first masked and second pluralities of pixel data from a first length to an expanded length;

performing said arithmetic operation on said first masked and second pluralities of pixel data to create an expanded result;

packing said expanded result to create a destination pixel having said first length; and creating a mask table with entries corresponding to different pixel formats.

2. The method of claim 1 wherein said step of packing said expanded result comprises:

scaling said expanded result; and clipping said expanded result to represent a value of at lest a minimum value and at most a maximum value.

3. The method of claim 1 further comprising the steps of masking said second plurality of pixel data to select only said certain bands.

4. A microprocessor comprising:

an instruction fetch and dispatch unit;

a plurality of execution units, including an integer execution unit, a floating point execution unit, and a plurality of graphics execution circuits added to said floating point execution unit;

a first register file coupled to said floating point execution unit;

said graphics execution circuits including an alignment circuit configured to align first and second source images having a plurality of pixel data with a plurality of bands;

a memory having a mask table storing values for masking said pixel data to select only certain of said bands; and a packing circuit configured to expand and pack said pixel data.

* * * * *